Figure 1:
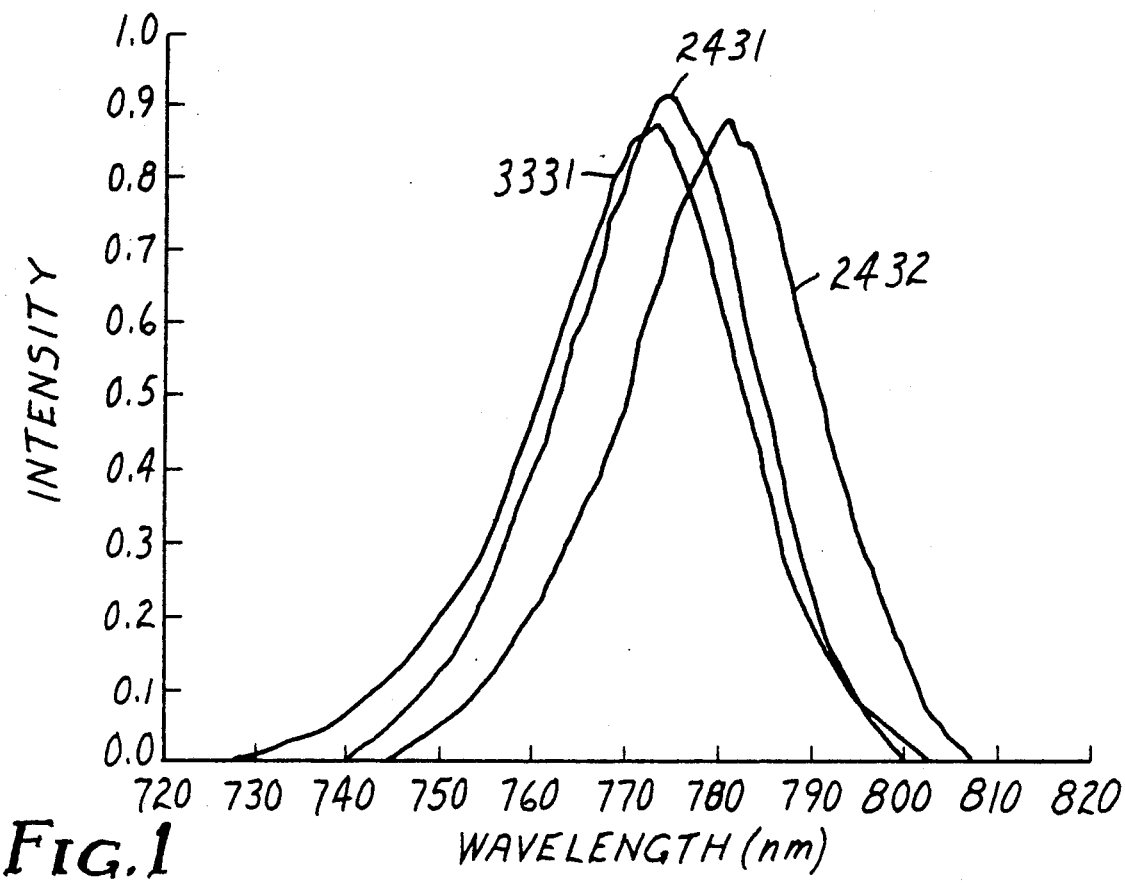

United States Patent [19]

Lea

[11] Patent Number: 5,051,762
[45] Date of Patent: Sep. 24, 1991

[54] PRODUCTION OF IMAGES USING AN ARRAY OF LIGHT EMITTING DIODES

[75] Inventor: Michael C. Lea, Harlow, England

[73] Assignee: Minnesota Mining and Manufacturing Company, St. Paul, Minn.

[21] Appl. No.: 596,851

[22] Filed: Oct. 12, 1990

[51] Int. Cl.⁵ ............................................ G03B 41/00
[52] U.S. Cl. ........................................................ 354/4
[58] Field of Search ............................................ 354/4

[56] References Cited

U.S. PATENT DOCUMENTS

| | | |
|---|---|---|
| 3,827,062 | 7/1974 | Mailloux ................................ 354/4 |
| 4,096,486 | 6/1978 | Pfeifer et al. ...................... 364/4 X |
| 4,435,064 | 3/1984 | Tsukata et al. ..................... 354/5 X |
| 4,589,745 | 5/1986 | Plummer ................................ 354/4 |

Primary Examiner—Michael L. Gellner
Attorney, Agent, or Firm—Gary L. Griswold; Walter N. Kirn; William D. Bauer

[57] ABSTRACT

Apparatus and imaging method in which an LED exposure apparatus having an array of light emitting diodes stationed in a light exposing relationship to a photosensitive material to be imaged is calibrated to take into account the wavelength difference between light emitting diode emissions and the spectral sensitivity of the photosensitive medium. The exposure apparatus is calibrated by making separate energy measurements of each light emitting diode with a detector through a colored filter. The spectral response of the detector and filter combination matches that of the photosensitive material in the wavelength region of the emission of the light emitting diode. The energy measurement are used to modulate each exposure level of the array of light emitting diodes. The calibration method is used during exposure of the photosensitive material by the array of light emitting diodes, particularly for grey scale imaging. The detector and filter are used to modulate exposure in response to the energy measurements.

5 Claims, 2 Drawing Sheets

PRODUCTION OF IMAGES USING AN ARRAY OF LIGHT EMITTING DIODES

This invention relates to the production of images, particularly grey scale images, using an array of light emitting diodes (LEDs) as the exposure source.

Electronic image recording apparatus of a type comprising a line exposure array stationed in a light exposing relationship to a photosensitive material and comprising a plurality of linearly spaced apart light emitting diodes are known in the art. Means are generally provided for effecting a relative displacement between the light exposure array and the photosensitive material in a direction transverse to the longitudinal axis of the exposure array so as to effect an exposure of the entire surface of the photosensitive material.

One can distinguish two types of imaging using LED bars, namely bi-level imaging and continuous tone (grey-scale) imaging. In the former, each pixel of the photo-sensitive media experiences either maximum or zero exposure by an element of the LED bar, and the image comprises dots of maximum optical density on a background of minimum optical density. On the other hand, continuous tone imaging requires that each pixel receives an exposure that is continuously variable, or variable over a sufficiently large number of discrete levels so as to mimic continuous variability. The latter type of imaging is needed in areas such as high quality colour reproduction, and requires control of the exposure parameters with a degree of precision not achieved in the prior art, involving the solution of problems not hitherto recognised. These include transient turn-on and -off effects, and pixel shape and spacing effects, and also source wavelength variation effects. The latter effects are addressed by the present invention.

There are various different arrangements of such image recording apparatus used in bi-level printing applications, which are primarily concerned with obtaining equal energy exposure from each image and eliminating "unexposed lines" in the image caused by gaps between adjacent LEDs or between rows of LEDs. Examples of such arrangements are disclosed in U.S. Pat. Nos. 3,827,062, 4,096,486, 4,435,064 and 4,589,745 and Japanese patent application No. 60-175065.

Whilst the arrangements of the prior art have attempted to control the variation of intensity from LED to LED, the degree of control required for bi-level printing applications is small compared to that required for grey scale imaging where the exposure must be controlled to a precision of 0.5%. The major problem of variation of intensity between separate LEDs can be reduced by measuring these intensities with a photosensor and applying corresponding exposure corrections. However, this does not entirely solve the problem. It has been found that there are often wavelength variations between the emissions of separate LEDs and that such wavelength variations may interact with the film spectral sensitivity to give different effective exposures for the same incident energy.

The present invention provides an imaging method in which the LED exposure apparatus is calibrated to take into account the wavelength difference between LED emissions and the spectral sensitivity of the photosensitive medium.

Therefore according to the present invention there is provided a method of calibrating an exposure apparatus comprising an array of light emitting diodes to a photosensitive material to be imaged, which method comprises making separate energy measurements of each light emitting diode with a detector through a coloured filter, so that the spectral response of the detector and filter combination matches that of the photosensitive material in the wavelength region of the emission of the light emitting diode and using said energy measurements to modulate each exposure level of the array of light emitting diodes.

The invention also extends to the use of the calibration method during exposure of the photosensitive material by the array of LED's, particularly for grey scale imaging, and to exposure apparatus incorporating calibration means comprising the detector and filter and control means to modulate exposure in response to the energy measurements.

In order to produce uniform exposure from an LED bar, the energy output of each individual element must be measured, and a corresponding correction applied during exposure. The energy measured by a photosensor depends on the spectrum of the source and the spectral response of the detector and will be the integral of the product of the two. Equally, the effective exposure detected by the photosensitive material depends on the LED spectrum and the spectral sensitivity of the photosensitive medium. If all the LEDs in a bar have the same spectrum then there is a constant ratio between the detector measurements and the integrated energy detected by the photosensitive material. However, LED bars typically show wavelength variations of a few nm, which means that photodetector measurements are no longer representative of the exposure seen by the film.

The arrangement of the invention is to make energy measurements through a coloured filter so that the spectral response of the detector/filter combination matches that of the photosensitive material. The detector then detects exactly what is detected by the photosensitive material.

Measurements of LED energy may be performed at the factory to calibrate a bar initially, but must also be done in situ to automatically re-calibrate the bar during use. Photodetectors with filters are preferably built into the machine itself and accordingly the machine will be calibrated only for one particular photosensitive material.

From a theoretical point of view the energy measured by a bare silicon photodiode is:

$$E \text{ (detector/no filter)} = \int_\lambda D(\lambda)S(\lambda)d\lambda \quad (1)$$

in which $D(\lambda)$ is the spectral response of the detector,
$S(\lambda)$ is the spectrum of the LED.

When a filter with a transmission $F(\lambda)$ is placed over the detector, the measured energy now becomes:

$$E \text{ (detector + filter)} = \int_\lambda F(\lambda)D(\lambda)S(\lambda)d\lambda \quad (2)$$

The spectral response of the film is defined in the following way:

$$M(\lambda) = \frac{1}{\text{energy required to achieve a specific optical density}} \quad (3)$$

This spectral response can be derived from a wedge spectrum (optical density vs. wavelength) and a D log E curve for the material.

Then the effective energy seen by the film is:

$$E\text{ (film)} = \int_\lambda M(\lambda)S(\lambda)d\lambda \quad (4)$$

The combined filter/detector to measure this effective energy is required, so from equations (2) and (4):

$$E\text{ (detector+filter)} = E\text{(film)} \quad (5)$$

Thus, the required spectral transmission of the filter is:

$$F(\lambda) = \frac{M(\lambda)}{D(\lambda)} \quad (6)$$

The invention will now be described with reference to the accompanying drawings.

FIG. 1 shows the spectra over the wavelength range 730 nm to 810 nm of three LEDs on a 400 dots per inch (dpi) Hitachi HLB440A bar commercially available from Hitachi. These spectra represent the extremes of variation across the bar; a difference in the peak wavelength of about 10 nm. There are also differences in both the width and shape, of the spectra, such that the peak wavelength is not sufficient to characterise the spectrum of an LED.

In order to prove the principle of the filter measurement method a commercial filter was chosen which provided the closest match to the spectral response of the photographic film. For optimum results a custom filter is required.

Figure 2:
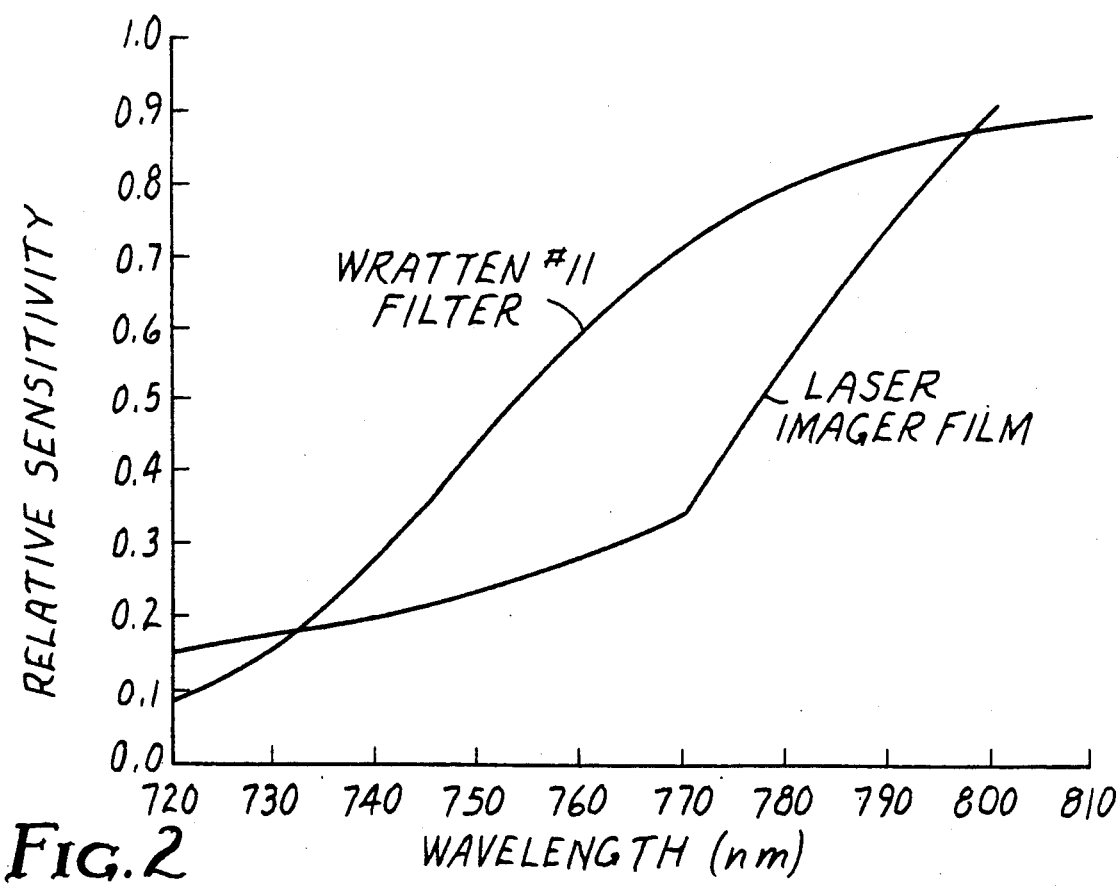

FIG. 2 shows the spectral sensitivity of laser imager film commercially available from Minnesota Mining and Manufacturing Company under the Trade Mark 3M SX560, and the spectral transmission of a Wratten 11 filter. The response of a silicon photodiode is fairly flat compared with these two plots.

Figure 3:
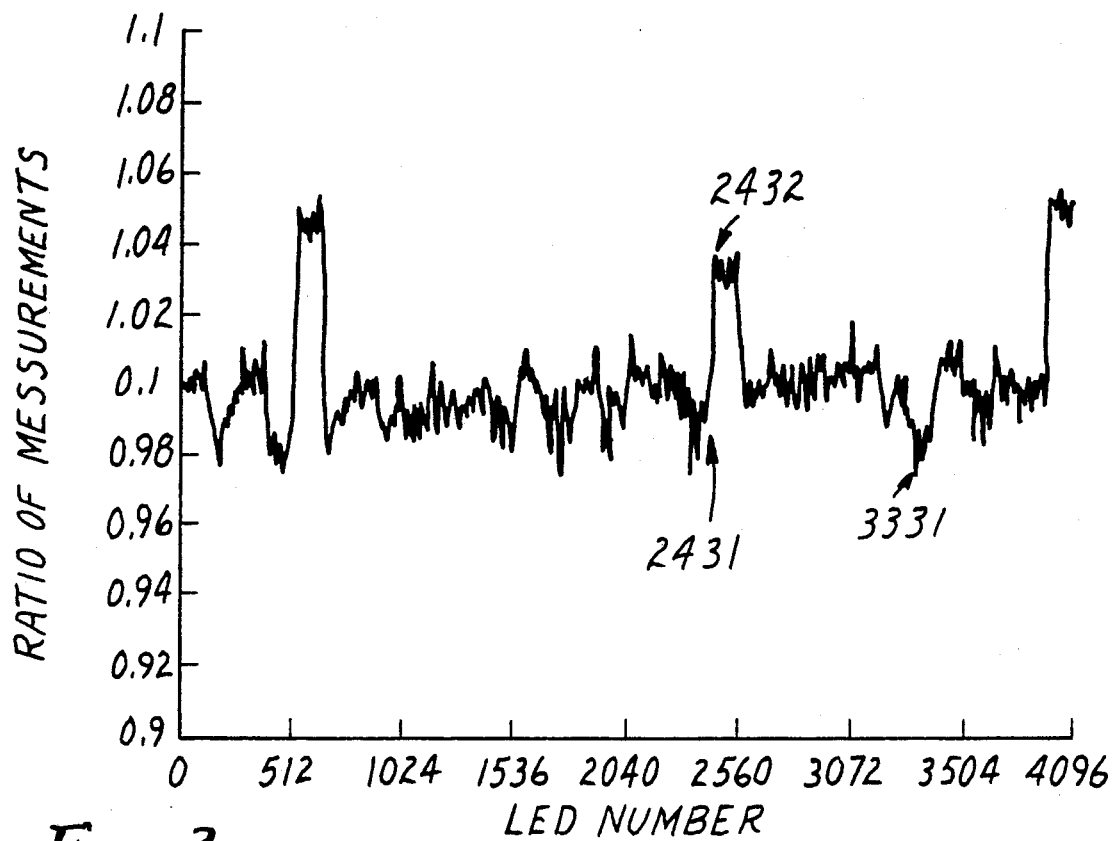

Measurements of LED intensity were made both with and without the Wratten filter over the detector. FIG. 3 shows the ratio of these two measurements; the variation is entirely due to the filter and reveals the effects of LED spectral variations.

The Hitachi LED bar is made up of 32 chips, each with 128 LEDs. It is notable that gross variations can be seen from chip to chip. This is to be expected since the LED spectrum depends principally on the doping levels of the material, and this is likely to be fairly consistent within a chip, but will vary from chip to chip, especially if they are selected from different batches. The LEDs whose spectra are shown in FIG. 1 are marked on FIG. 3.

Figure 4:
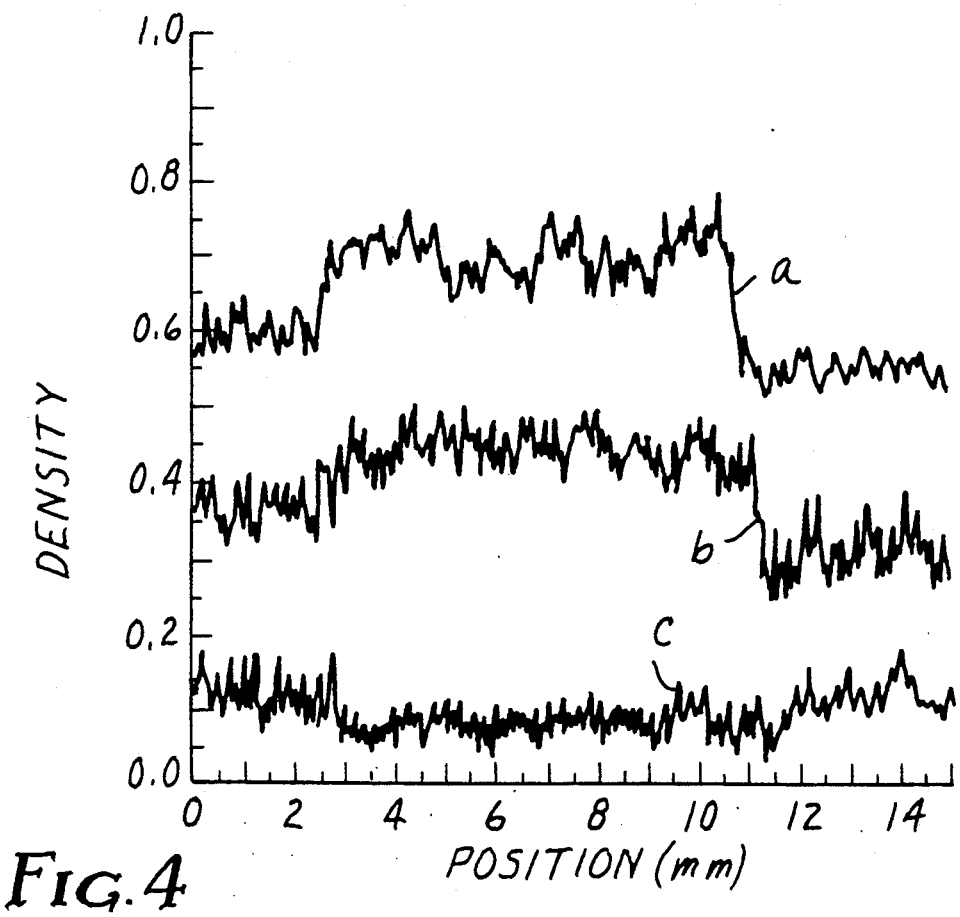

FIG. 4 shows microdensitometer scans of exposed film covering about 256 LEDs, for the three cases of:
 a) No corrections applied,
 b) Corrections based on measurements with a bare silicon photodiode,
 c) Corrections based on measurements with a photodiode/filter combination.

The plots have been separated vertically in FIG. 4 in the interests of clarity.

The central block visible in these plots corresponds to LEDs numbers 2432-2559 which have peak wavelengths of about 780 nm, while the LEDs at either end of the plot have peak wavelengths of about 773 nm.

It is apparent that the bare photodiode measurements have produced some improvement but have by no means eliminated the density variations. The filter measurements however show a distinct improvement.

The spectra of the LEDs of the Hitachi bar were also found to have side peaks in the region of 880 nm which may contribute to film density variations. Other LED bars, e.g., Sanyo LPH-13216-07 do not have side peaks in their emission spectra. In order to minimise the problem caused by exposure at different wavelengths it is preferable to use LEDs which have no side peaks in their emission spectra.

In addition to the wavelength variation of emission between individual LEDs it has been found that the emission of LEDs may vary with temperature. This variation of emission can contribute to film density variations since the LED bar generally increases in temperature during use and it is difficult to maintain a predetermined constant temperature. However, the temperature effect may be compensated for by making repeated readings to the LEDs at different temperatures and using the data to generate a series of "look-up" tables to provide the necessary exposure correction at each temperature. A preferred exposure system includes one or more temperature sensors at the LED bar, look-up tables and associated software to automatically apply any necessary temperature-dependent correction to the exposure time of the LEDs.

I claim:

1. A method of calibrating an exposure apparatus comprising an array of light emitting diodes to a photosensitive material to be imaged, which method comprises making separate energy measurements of each light emitting diode with a detector through a coloured filter, so that the spectral response of the detector and filter combination matches that of the photosensitive material in the wavelength region of the emission of the light emitting diode and using said energy measurements to modulate each exposure level of the array of light emitting diodes.

2. A method of recording an image which comprises exposing a photosensitive material with an exposure apparatus comprising an array of light emitting diodes, which method comprises making separate energy measurements of each light emitting diode with a detector through a coloured filter, so that the spectral response of the detector and filter combination matches that of the photosensitive material in the wavelength region of the emission of the light emitting diode and using said energy measurements to modulate each exposure level of the array of light emitting diodes during said exposure.

3. A method as claimed in claim 2 which additionally comprises modulating each exposure level to compensate for variation of emission of the light emitting diodes with temperature.

4. A method as claimed in claim 2 for producing a grey scale image in which individual light emitting diodes emit at different exposure levels corresponding to the level of grey required in the final image.

5. Exposure apparatus comprising an array of light emitting diodes and calibration means for making separate energy measurements of each light emitting diode with a detector through a coloured filter, so that the spectral response of the detector and filter combination matches that of a photosensitive material to be exposed in the wavelength region of the emission of the light emitting diodes and control means for modulating each exposure level of the array of light emitting diodes in response to said energy measurements.

* * * * *